United States Patent [19]
Akeel et al.

[11] Patent Number: 5,034,618
[45] Date of Patent: Jul. 23, 1991

[54] METHOD FOR ALIGNING AN ARTICULATED BEAM DELIVERY DEVICE, SUCH AS A ROBOT

[75] Inventors: Hadi A. Akeel; Stan H. McClosky, both of Rochester, Mich.

[73] Assignee: GMF Robotics Corporation, Auburn Hills, Mich.

[21] Appl. No.: 402,236

[22] Filed: Sep. 5, 1989

[51] Int. Cl.$^5$ .............................................. G01N 21/86
[52] U.S. Cl. ..................................... 250/561; 356/152
[58] Field of Search ............................ 250/561, 203.1; 356/141, 152; 219/121.78, 121.79

[56] References Cited

U.S. PATENT DOCUMENTS

| | | | |
|---|---|---|---|
| 4,566,202 | 1/1986 | Hamar | 33/286 |
| 4,659,916 | 4/1987 | Müller et al. | 219/121.79 |
| 4,724,298 | 2/1988 | Hawkins et al. | 219/121.78 |
| 4,840,483 | 6/1989 | Haffner | 356/400 |

Primary Examiner—David C. Nelms
Attorney, Agent, or Firm—Brooks & Kushman

[57] ABSTRACT

A method is provided for aligning an articulated beam delivery device, such as a robot, by utilizing an electronic, high resolution television camera as a transducer for measuring small beam deviations at relatively short distances. A display monitor coupled to the camera is located in view of an operator of the robot to provide direct visual feedback for use during the aligning method. The aligning method includes the step of transmitting a collimated optical beam so that the beam travels along a first base path and is deflected by an adjustable mirror supported on an arm assembly having first and second axes of the robot for rotation therewith about the first axis and thence along a second beam path. The beam is also deflected by at least one other mirror supported within a wrist mechanism of the robot to travel along a third beam path to a beam exit end of the robot. The camera is mounted on a tool support member rotatable about a third axis of the wrist mechanism to sense the beam and to thereby generate a video image containing a beam point related to the beam. The beam point is then displayed on the video display device. In order to adjust the first mirror, the operator causes the arm assembly and, consequently, the camera to rotate about the first axis so that the beam point on the display device traces a curve, every point of which is substantially equidistant from a fixed center point.

17 Claims, 4 Drawing Sheets

METHOD FOR ALIGNING AN ARTICULATED BEAM DELIVERY DEVICE, SUCH AS A ROBOT

TECHNICAL FIELD

This invention relates to a method for aligning an articulated beam delivery device and, in particular, to a method for aligning an articulated beam delivery device such as a robot wherein the beam is a collimated beam, such as a laser beam.

BACKGROUND ART

When a collimated optical beam, such as a laser beam, is transmitted through an articulated beam manipulating or delivery device, such as a robot, the beam typically goes through several reflections. Reflecting mirrors are utilized in what is known as an optical joint, to pass the beam through the articulating joints of the device. The beam travels in straight line segments between each successive optical joint.

Any error in the alignment of the mirrors in the optical joints results in progressive deviation of the point of incidence of the beam on the following mirrors. Considerable deviations render the articulating device ineffective if the mirrors are not properly aligned. Large beam travel distances magnify the mirror alignment errors and require higher accuracy in alignment.

In order to attain higher accuracy alignments of mirrors in optical joints, a light beam is conventionally shined on the mirror along one of the axes of the optical joint and is intercepted at a distance along the other axis of the optical joint, as illustrated in FIGS. 1a and 1b. A grid is used to identify the axis "0" of the optical joint at the point of incidence "A" of the reflected beam. When the optical joints and the grid are rotated 360° relative to the misaligned mirror, the point of beam incidence on the grid describes a full circle of radius "OA" where OA is equal to $e \times D$ (e equals the angle of misalignment in radians and D is equal to the beam travel distance from the misaligned mirror to the grid surface).

Typically, the mirror orientation is corrected by adjusting screws to make the point of incidence coincide with the joint axis. To attain desired accuracy levels, the grid must be located at relatively long distances to magnify the error and allow finer adjustments. Such long distances make the calibration apparatus impractically long.

For the alignment of the final mirror in an optical chain, the alignment apparatus may be rotated about the final optical axis. Circular movement of the point of beam incidence on the grid indicates misalignment of the final mirror and can be corrected for by adjustment screws.

Referring now to FIG. 2 there is illustrated another prior art method for correcting for these shortcomings by using multiple reflecting mirrors which are pre-aligned and precisely oriented. These mirrors fold the long-beam travel distances into a compact package. However, this method has several shortcomings such as: (1) the folding mirrors add weight and expense to the apparatus; (2) the cost is increased because of the precise requirements of the folding mirrors and the need to accurately calibrate and align the apparatus itself; (3) the method does not provide quantitative measurements of the alignment error to the operator; (4) the method does not give direct feedback to the operator since the location of the apparatus may not always be within his visual range; (5) the resolution of the error is severely limited by the size of the apparatus, its weight and the limit of visual detection; and (6) the apparatus only magnifies angular misalignments.

Another common misalignment problem appears as a parallel offset in the path of the beam. This is illustrated in FIG. 3 wherein deviation of the beam off the center of the optical joint is illustrated. Because the deviation remains parallel to the optical joint center line, the deviation is not magnified by the folding mirrors. This error is usually corrected by the use of a pinhole aperture at the entrance of the beam and thereafter making the necessary required adjustments to the incoming beam source to affect beam entry through that aperture. The level of accuracy obtained, however, is limited by the size of the aperture and the limits of human perception of beam location.

The Hawkins et al U.S. Pat. No. 4,724,298 discloses a method for aligning a laser beam transmitter and a receiver. A low-powered visible laser is directed along the path to be followed by a high-powered laser. A viewer, such as a video camera, is used for rough alignment. A pellicle, a partially reflecting mirror, and three low-powered beam detectors of the pyroelectric type are used with the low-powered laser to align the beam transmitter with the beam receiver. One of the video cameras is mounted on a housing which is attached to a housing of the beam transmitter and is movable therewith for viewing the position and orientation of the beam receiver with respect to a reflector.

DISCLOSURE OF THE INVENTION

An object of the present invention is to provide a method for aligning an articulated beam delivery device, such as a robot, quickly yet accurately with an electronic imaging device coupled to a display mechanism which provides direct visual feedback for the alignment method.

Another object of the present invention is to provide a method for aligning an articulated beam delivery device, such as a robot, by utilizing a relatively compact, electronic, high resolution camera which allows direct data acquisition for display and calculation of the magnitude of the alignment error, thereby allowing quantitative measurement of the alignment error.

Another object of the invention is to provide a method for aligning an articulated beam delivery device, such as a robot, wherein the method provides quantitative measurement of the alignment error and guides the operator through the most effective alignment steps.

Yet, still another object of the present invention is to provide a method for aligning an articulated beam delivery device, such as a robot, wherein the method utilizes an electronic camera which may be located at a considerable distance away from the operator of the apparatus, and a display monitor which may be located in view of an operator to provide direct visual feedback for the alignment method.

In carrying out the above objects and other objects of the present invention, a method for aligning an articulated beam delivery device having first and second axes angled to and intersecting one another, is provided. The device is used to deliver a collimated first beam, such as a laser beam, along a first beam path for deflection by a reflective first component along a second beam path to a beam exit end of the device. The device includes beam delivery first means supported for rotation about at least one of the axes and the first component having an adjustable orientation and being supported for rotation with the first means. The method includes the steps of transmitting a collimated second beam, so that the second beam travels along the first beam path and is deflected by the first component along the second beam path to the beam exit end. The method further includes the step of sensing the second beam at the beam exit end with an electronic imaging means responsive to the second beam to generate a first image containing a first beam point related to the second beam. The first beam point is displayed on display means coupled to the imagining means. At least one of the first means and the imaging means is then rotated about one of the first and second axes so that the first beam point on the display means traces a first curve. Every point on the first curve is substantially equidistant from a fixed first center point. Orientation of the first component is then adjusted so that the first beam point is substantially coincident with the first center point. In this way, the first beam path is coincident with the first axis and the second beam path is coincident with the second axis.

Preferably, the beam delivery device includes a robot having an arm assembly with the first and second axes. The robot has a continuous hollow passage that extends along and surrounds the first and second axes and to the imaging means.

Also, preferably, the second beam is a collimated optical beam, the first image is a video image, the imaging means includes a television camera and the display means includes a video display device.

The method preferably includes the step of mounting the television camera at the beam exit end of the device so that the television camera rotates about at least one of the axes of the device.

The advantages accruing to the use of the method of the present invention are numerous. For example, the electronic camera utilized in the method, is relatively compact. Also, the method allows direct data acquisition by computer based devices (i.e. the camera and the video display device) for display and calculation of the magnitude of any deviation of the beam path. In this way, quantitative measurements of the error are possible. Such requirements can be directly correlated to those adjustments that provide the most effective alignment correction, thereby guiding these operators and reducing their trial and error effort.

Also, the electronic camera utilized in the method can be located a considerably distance away from the operator as long as a display monitor coupled to the camera can be located in view of the operator to provide direct visual feedback for use by the operator during the alignment method.

Furthermore, the resolution of electronic grids and electronic cameras is so superior to visual detection by the operator, that alignment accuracy can be an order of magnitude better than the conventional approach.

Finally, the invention corrects the parallel offset error by utilizing the high resolution of the electronic camera to measure small deviations and detect accurately the exit point of the beam. Accurate corrections can thus be made, regardless of the size of the entry aperture without dependence on less reliable human perception. This feature allows quick alignment when compared to conventional methods that depend on a tedious trial and error approach to bring the beam to pass through an extremely small entry aperture.

Other advantages of the present invention will be readily appreciated as the same becomes better understood by reference to the following detailed description when considered in connection with the accompanying drawings.

BRIEF DESCRIPTION OF THE DRAWINGS

FIG. 1b is an end view of a grid of the device of FIG. 1a;

BEST MODE FOR CARRYING OUT THE INvENTION

Figure 5:
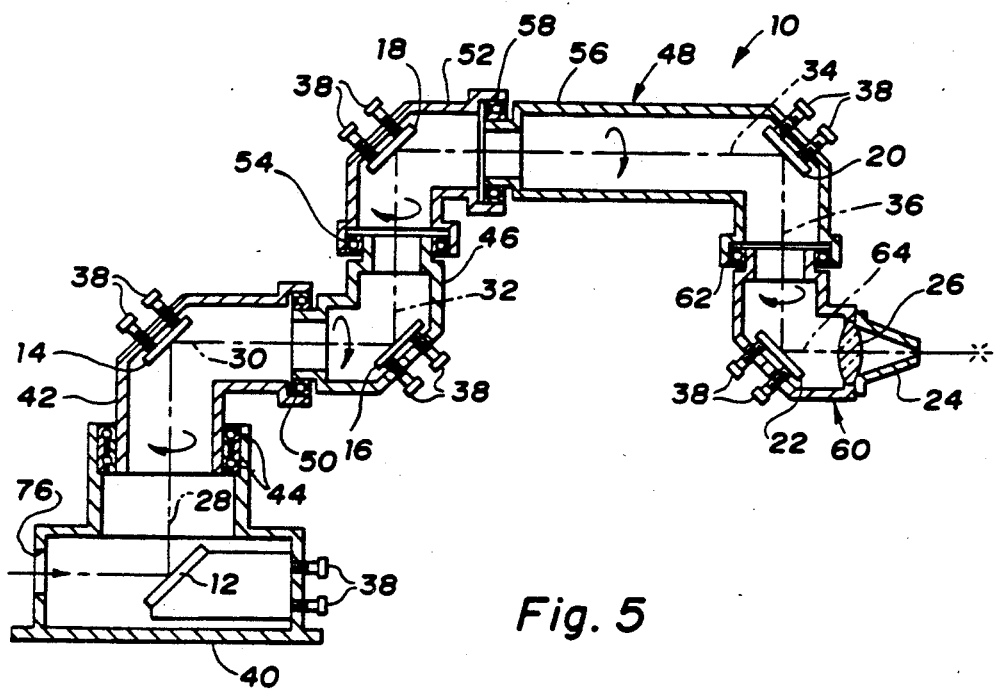
FIG. 5 is a side schematic view which diagrammatically represents an articulated laser beam delivery robot.

Referring now to FIG. 5, there is illustrated an articulated beam delivery device, such as a robot, generally indicated at 10, which is utilized to transmit a collimated first beam, such as a laser beam, along an internal beam path for deflection by one or more reflective components, such as mirrors 12, 14, 16, 18, 20 and 22 to a beam exit end of the device, which is protected by a conical shroud 24. As illustrated in FIG. 5, the robot 10 has five rotary joints. As is well known in the art, the conical shroud 24 protects the final focusing mirror or lens 26 from splattering of metal or other contaminants.

Each of the reflective surfaces of the mirrors 12 through 22 has an adjustable orientation within the robot 10, so that the path of the laser beam may be adjusted to coincide with the different rotary axes 28, 30, 32, 34 and 36 of the robot 10. Preferably, the angular orientation of each of the mirrors 12 through 22 is accomplished by adjusting screws 38 which extend through the outer wall of each robot part which supports its respective mirror. For example, the mirror 12 is adjustably supported within a lower base section 40 of the robot !0. The mirror 14 is adjustably supported within upper base section 42 of the robot 10. The upper base section 42 is rotatably supported on the lower base section 40 to rotate about the axis 28 by bearings 44.

The mirror 16 is adjustably supported within an offset section 46 of an arm assembly, generally indicated at 48 of the robot 10. The offset section 46 is rotatably supported on the upper base section 42 for movement about the axis 30 by bearings 50.

In like fashion, the arm assembly 48 includes an elbow section 52 which adjustably supports the mirror 18 therein. The elbow section 52 is rotatably supported on the offset section 46 to rotate about the rotary axis 32 by bearings 54.

The arm assembly 48 also includes an elongated arm section 56 which is rotatably supported on the elbow section 52 for rotation about the axis 34 by bearings 58. The elongated arm section 56 adjustably supports the mirror 20 therein which deflects the laser beam along its beam path to the mirror 22.

The robot 10 also includes a wrist mechanism, generally indicated at 60 which adjustably supports the mirror 22 therein. The mirror 22 deflects the laser beam so that the laser beam exits the beam exit end of the robot 10. The wrist mechanism 60 is rotatably supported on the elongated arm section 48 for rotation about the axis 36 by bearings 62. The wrist mechanism 60 includes the axis 36 and an exit axis 64 which, preferably, is coincident with the focal axis of the lens 26. For a detailed explanation of a similar articulated beam delivery robot 10, reference is hereby made to co-pending patent application entitled INDUSTRIAL LASER ROBOT SYSTEM, filed Nov. 3, 1988, having U.S. Ser. No. 266,679, the entire disclosure of which is hereby incorporated by reference.

Figure 1A:
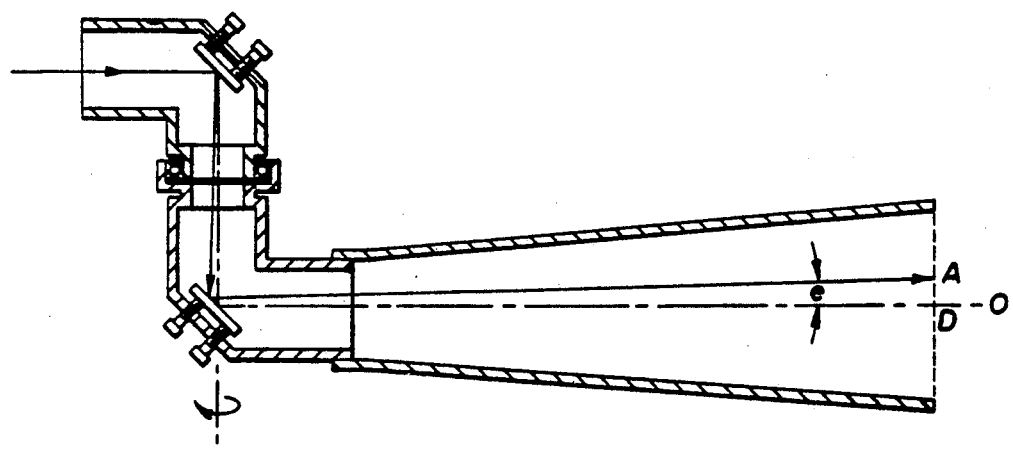
FIG. 1a is a side schematic view of an articulated beam delivery device illustrating a prior art alignment process.
Figure 2:
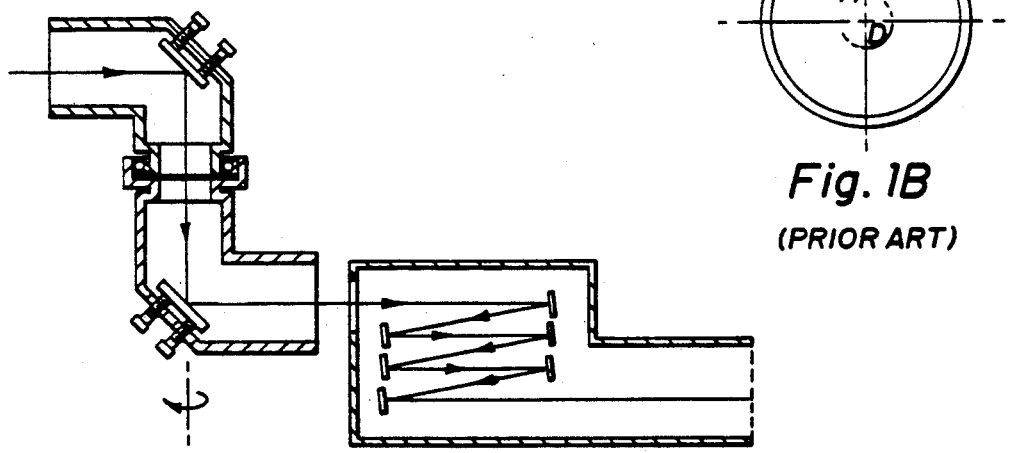
FIG. 2 is a side schematic view of an articulated beam delivery device including an alignment mechanism having a plurality of pre-aligned beam folding mirrors with a grid located at the beam exit end of the device.
Figure 1B:
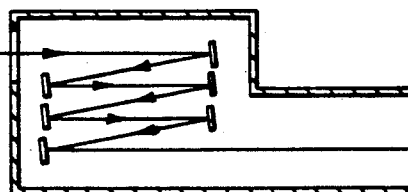
Figure 3:
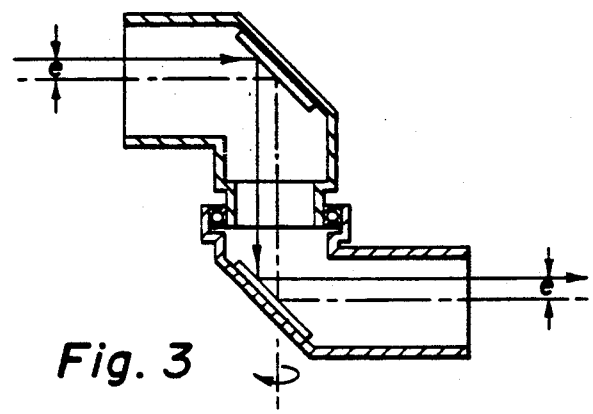
FIG. 3 is a side schematic view of an articulated beam delivery device illustrating parallel, offset misalignment of the beam.
Figure 4:
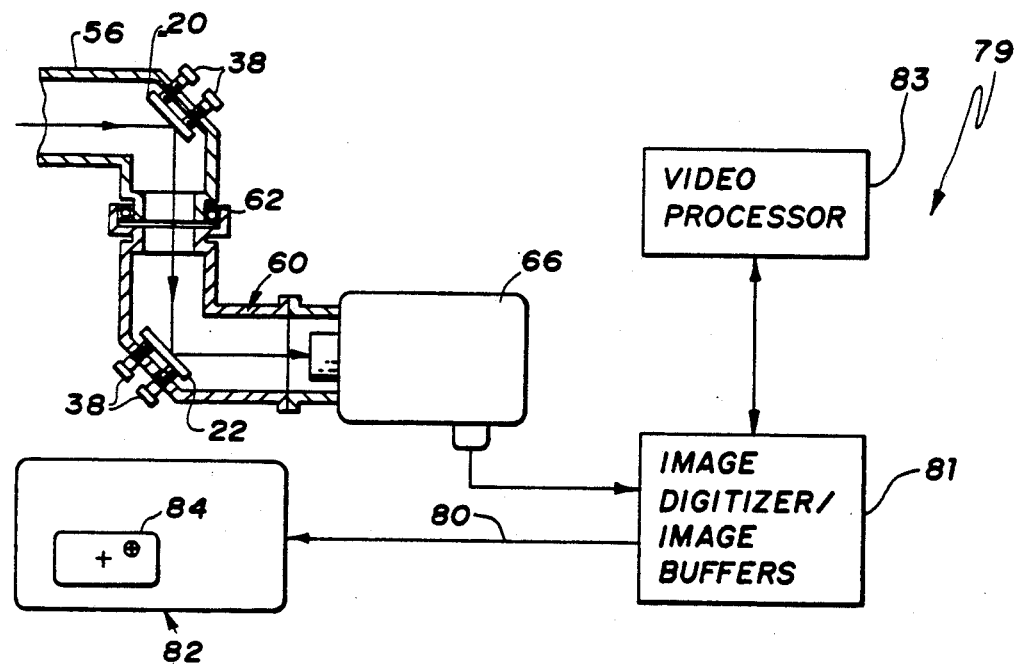
FIG. 4 is a side schematic view illustrating the method of the present invention to measure small beam deviations at relatively small distances wherein a camera is utilized in an in-line arrangement.

Referring now to FIG. 4, there is illustrated the robot 10 of FIG. 5 with the lens 26 and its conical shroud 24 removed and replaced with a high resolution electronic imaging means or camera 66 of a machine vision system, generally indicated at 79. The system 79 includes an image digitizer image buffer 81 coupled to a video processor 83 for processing the video data. The processed video data is thereafter sent back to an image buffer of the block 81 for display, as is described hereinbelow.

Figure 6:
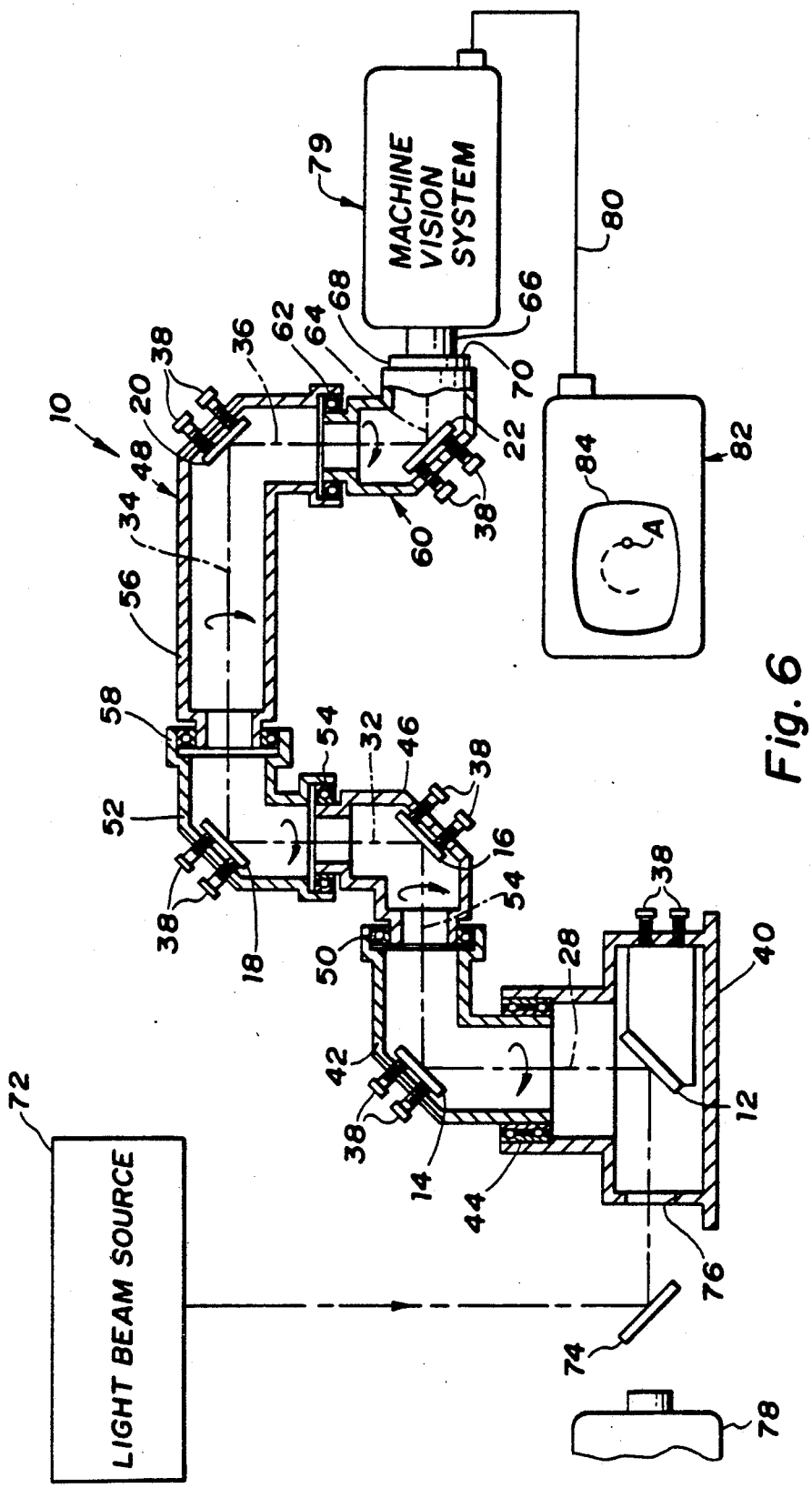
FIG. 6 is a view of the robot of FIG. 4 together with alignment apparatus of the method of the present invention with the focusing lens or mirror at the beam exit end of the robot removed.

The camera 66 is preferably mounted on a tool support member 68 of the wrist mechanism 60 as shown in FIG. 6. The tool support member 68 has a tool mounting surface 70 on which the camera 66 is mounted for rotary movement therewith about the exit axis 64 of the wrist mechanism 60.

Details of such a machine vision system 79, including the camera 66, can be found in U.S. Pat. No. 4,707,647, the entire disclosure of which is hereby expressly incorporated by reference. Details of such a support member can be found in U.S. Pat. No. 4,708,580 which is hereby expressly incorporated bY reference.

The high resolution electronic camera 66 is capable of sensing a collimated incandescent light beam provided by a light beam source 72. The collimated light beam is reflected by a mirror 74 for entry through an aperture 76 formed in the lower base section 40. The light beam traces the same path as that of a high-powered laser beam provided by a laser power source 78 which is turned off during the aligning process. Also, the mirror 74 is only provided during the aligning process.

The vision system 79 is electrically coupled via a cable 80 to a display means or monitor, generally indicated at 82, including a CRT 84. In general, the light beam reflected by the mirror 22 is sensed by the electronic camera 66, to generate an image containing a beam point related to the light beam. In turn, the CRT 84 displays the beam point as point A on the CRT 84.

In order to adjust one of the mirrors, such as the mirror 16, the arm assembly 16 is rotated either manually or automatically by an operator about the axis 54. When this occurs, the point A will be observed to migrate on the CRT 84 to trace a generally circular, though irregular path. In general, every point on the curve, is substantially equidistant from a fixed center point. Adjustment screws 38 of the mirror 16 are then utilized to adjust orientation of the mirror 16 within the offset section 46 to bring point A to the apparent center point of the circular trace. This process of rotating the arm assembly 48 about the axis 54 and further adjusting the orientation of the mirror 16 is then repeated until point A remains stationary on the CRT 84 or within an acceptable tolerance as the arm assembly 48 is rotated about the axis 54.

The process of adjustment described above is a trial and error process. The error is reduced gradually with each adjustment until the required degree of alignment is attained. However, the availability of the error data in a digital form also allows a more expedient and direct approach to the alignment.

Figure 7:
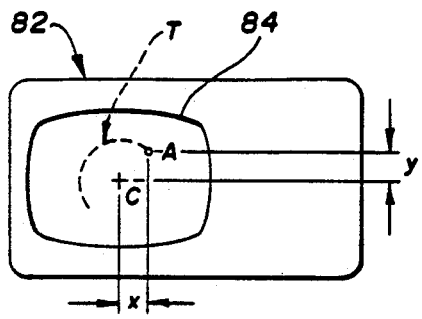
FIG. 7 is an enlarged view of the monitor of FIGS. 4 and 6.
Figure 8:
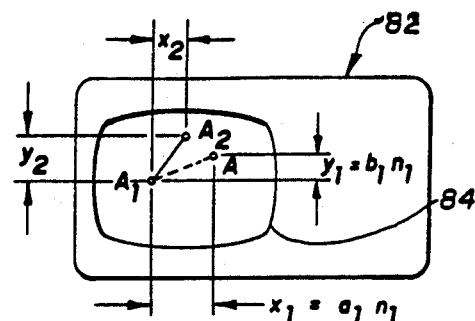
FIG. 8 is a view of the monitor of FIG. 7 with various axes being depicted on a CRT.
Figure 9:
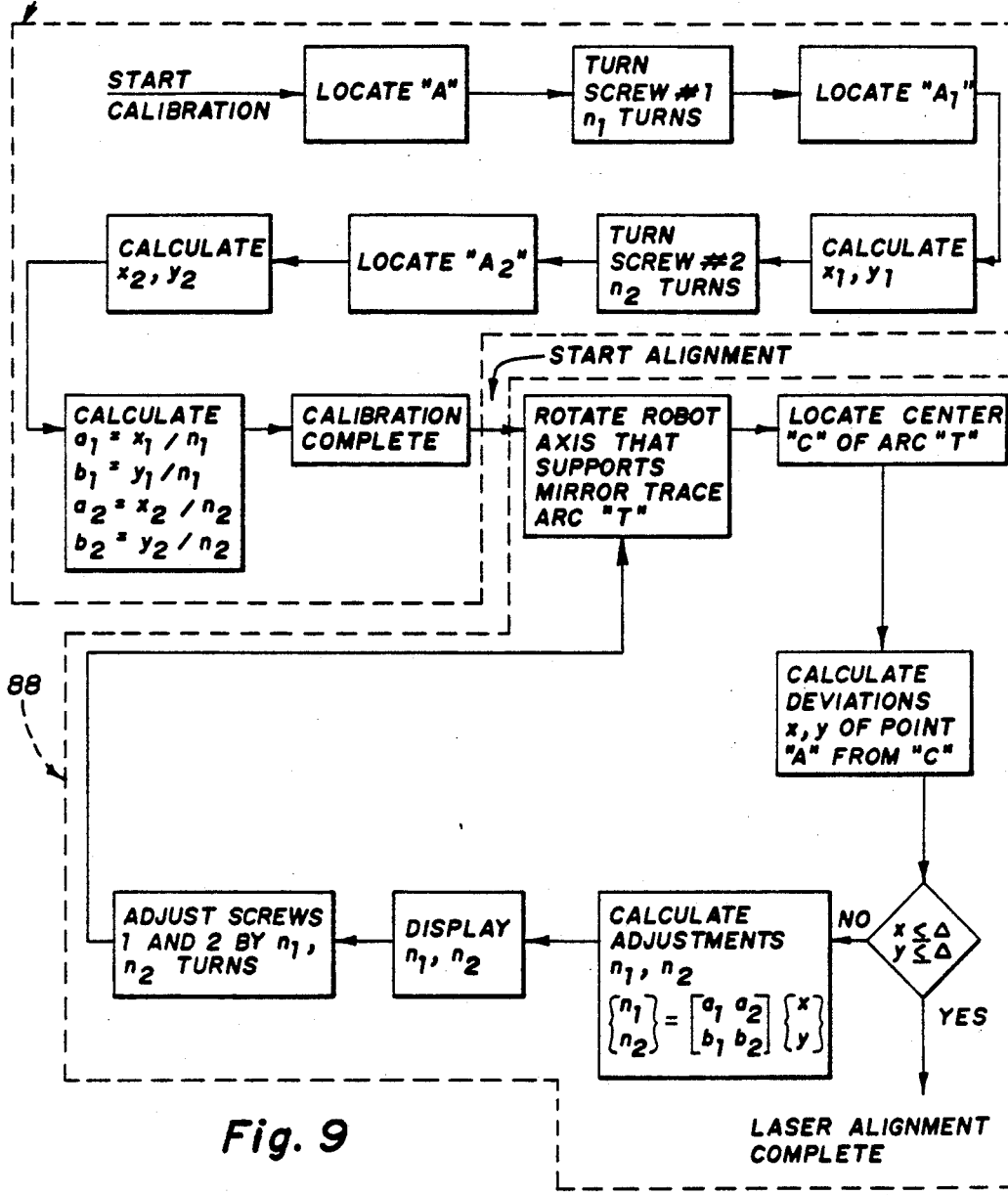
FIG. 9 is a block diagram flowchart illustrating the various steps for calibrating and aligning the device by adjusting a mirror.

Referring now to FIGS. 7 through 9, the video camera 66 provides the digital data of the location of point "A" of the misaligned beam. As generally indicated at block 88, the alignment process requires that the center point "C", which represents the target point for an aligned beam, be calculated from the digital data of any three (3) points which fall in the trace "T" by elementary geometrical equations. The cartesian displacements x, y of point A relative to point C are related to the two screw adjustments of the mirror being aligned by the following matrix equations:

$$\left\{ \begin{array}{l} x = \begin{bmatrix} a_1 & a_2 \end{bmatrix} \begin{bmatrix} n_1 \\ n_2 \end{bmatrix} \\ y = \begin{bmatrix} b_1 & b_2 \end{bmatrix} \begin{bmatrix} n_1 \\ n_2 \end{bmatrix} \end{array} \right\}$$

where $n_1$, $n_2$ are the number of turns, or fraction thereof, for first and second adjusting screws 38, respectively, and $a_1$, $a_2$, $b_1$ and $b_2$ are coefficients determined by calibration. While many approaches are possible, the calibration is preferably done as described hereinbelow with reference to block 90.

By moving a first adjusting screw 38 a first rotation, $n_1$, point A would be displaced by point $A_1$ at coordinates $x_1 = a_1 n_1$ and $y_1 = b_1 n_1$ since both $x_1$, $y_1$ are measurable and can be provided by the digital data from the video camera 66, coefficients $a_1$ and $b_1$ are readily determined. Similarly $_2$ and $b_2$ can be determined by moving a second adjusting screw 38 a second rotation, n,, causing point $A_1$ to move to point $A_2$.

The linear relation between n and displacements x and y is approximate and accurate enough for the small adjustments associated with laser beam alignment within the confines of the aperture of the video camera 66.

This process can be repeated for the mirrors 12, 14, 18 and 20 wherein structural rotations of the robot 10 are performed about the reflected beam axis downstream from the mirror that is being aligned.

Instead of the mirror 22 being rotated with its respective supporting wrist mechanism 60, the camera 66 is rotated 360° about the axis 64 via the tool support member 68. Again, point A will trace a generally circular path on the CRT 84 indicative of the degree of misalignment of the mirror 22.

While the best mode for carrying out the invention has herein been described in detail, those skilled in the art to which this invention relates will recognize various alternative designs and embodiments for practicing the present invention as defined by the following claims.

What is claimed is:

1. A method for aligning an articulated beam delivery device having first and second axes angled to and intersecting one another, the device being used to delivery a collimated first beam, such as a laser beam, along a first beam path for deflection by a reflective first component along a second beam path to a beam exit end of the device, the device including beam delivery first means supported for rotation about at least one of the axes and the first component having an adjustable orientation and being supported for rotation with the first means, the method comprising the steps of:

transmitting a collimated second beam so that the second beam travels along the first beam path and i deflected by the first component to travel along the second beam path to the beam exit end;

sensing the second beam at the beam exit with an electronic high resolution television camera responsive to the second beam to generate a first image containing a first beam point related to the second beam;

displaying the first beam point on a display monitor coupled to the camera;

rotating at least one of the first means and the camera about one of the first and second axes so that the first beam point on the display monitor traces a first curve, every point of the first curve being substantially equidistant from a fixed center point; and adjusting the orientation of the first component prior to and asynchronous with the delivery of the collimated first beam along the first beam path so that the first beam point is substantially coincident with the first center point whereby the first beam path is coincident with the first axis and the second beam path is coincident with the second axis.

2. The method as claimed in claim 1 wherein the beam delivery device includes a robot having an arm assembly with the first and second axes, the robot having a continuous hollow passage that extends along and surrounds the first and second axes and to the camera.

3. The method as claimed in claim 1 wherein the device further includes beam delivery second means having a third axis and supported on the first means and a reflective second component having an adjustable orientation and being supported on the second means, and wherein the second beam is deflected by the second component to travel along a third beam path by the second component to travel along a third beam path to the beam exit end of the device and the camera generates a second image containing a second beam point related to the second beam, the method further comprising the steps of:

rotating the camera about the third axis so that the second beam point on the display monitor traces a second curve, every point on the second curve being substantially equidistant from a fixed second center point; and adjusting the orientation of the second component on the second means so that the second beam point is substantially coincident with the second center point whereby the third beam path is coincident with the third axis.

4. The method as claimed in claim 3 wherein the beam delivery device includes a robot having an arm assembly with the first and second axes and a wrist mechanism with the third axis and supported on the arm assembly, the robot having a continuous hollow passage that extends along and surrounds the first, second and third axes and to the imaging means.

5. The method as claimed in claim 4 wherein the wrist mechanism includes a tool support member having a tool mounting surface pivotal about the third axis, the camera being mounted on the mounting surface at the beam exit end to rotate therewith about the third axis.

6. A method for aligning an articulated beam delivery robot having first, second and third axes, the first and second axes being angled to and intersecting one another, the robot being used to deliver a collimated first beam, such as a laser beam, along a first beam path for deflection by a reflective first component along a second beam path and for deflection by a reflective second component, along a third beam path to a beam exit end of the robot, the robot including an arm assembly with the first and second axes and supported for rotation about at least one of the first and second axes, the first component having an adjustable orientation and being supported for rotation with the arm assembly, the robot further including a wrist mechanism supported on the arm assembly and having the third axis, the second component being supported with an adjustable orientation by the wrist mechanism, the method comprising the steps of:

transmitting a collimated second beam so that the second beam travels along the first beam path, is deflected by the first component to travel along the second beam path and is deflected by the second component to travel along a third beam path to the beam exit end;

sensing the second beam at the beam exit end with an electronic high resolution television camera responsive to the second beam to generate a first image containing a first beam point related to the second beam;

displaying the first beam point on a display monitor coupled to the camera;

rotating the arm assembly about one of the first and second axes so that the second beam point on the display monitor traces a first curve, every point of the first curve being substantially equidistant from a fixed first center point;

adjusting the orientation of the first component prior to and asynchronous with the delivery of the collimated first beam along the first beam path so that the first beam point is substantially coincident with the first center point whereby the first beam path is coincident with the first axis and the second beam path is coincident with the second axis;

continuing transmitting the second collimated beam so that the second beam is deflected by the second component to travel along the third beam path to the beam exit end of the device;

continuing sensing the second beam along the third beam path at the beam exit end of the device with the camera to generate a second image containing a second beam point related to the second beam;

displaying the second beam point on the display monitor;

rotating the camera about the third axis so that the second beam point on the display monitor traces a second curve, every point on the second curve being substantially equidistant from a fixed second center point; and adjusting the orientation of the second component prior to and asynchronous with the delivery of the collimated first beam along the first beam path so that the second beam point is substantially coincident with the second center point whereby the third beam path is coincident with the third axis.

7. The method as claimed in claim 1 or claim 6 wherein the first component includes a mirror.

8. The method as claimed in claim 1 or claim 6 wherein the second beam is a collimated optical beam, and the first image is a video image.

9. The method as claimed in claim 1 or claim 6 further comprising the step of mounting the camera at the beam exit end so that the camera rotates about at least one of the taxes.

10. The method as claimed in claim 9 wherein the second beam is a collimated optical beam.

11. A method for aligning an articulated beam delivery device having first and second axes angled to and intersecting one another, the device being used to deliver a collimated first beam, such as a laser beam, along a first beam path for deflection by a first mirror along a second beam path to a beam exit end of the device, the device including beam delivery first means supported for rotation about at least one of the axes and the first mirror having an adjustable orientation and being supported for rotation with the first means, the method comprising the steps of:

transmitting a collimated optical beam so that the optical beam travels along the first beam path and is deflected by the first mirror to travel along the second beam path to the beam exit end;

sensing the second beam at the beam exit end with an electronic, high resolution television camera responsive to the second beam to generate a first video image containing a first beam point related to the second beam;

displaying the first beam point on a video display device coupled to the television camera;

rotating at least one of the first means and the television camera about one of the first and second axes so that the first beam point on the video display device traces a first curve, every point of the first curve being substantially equidistant from a fixed first center point; and adjusting the orientation of the first mirror prior to and asynchronous with the delivery of the collimated first beam along the first beam path so that the first beam point is substantially coincident with the first center point whereby the first beam path is coincident with the first axis and the second beam path is coincident with the second axis.

12. The method as claimed in claim 11 wherein the beam delivery device includes a robot having an arm assembly with the first and second axes, the robot having a continuous hollow passage that extends along and surrounds the first and second axes and to the television camera.

13. The method as claimed in claim 12 further comprising the step of mounting the television camera at the beam exit end so that the television camera rotates about at least one of the axes.

14. The method as claimed in claim 1 or claim 6 wherein the camera include a video processor and wherein the method further includes the step of utilizing the video processor to automatically determine the locations of a plurality of points on the first curve.

15. The method as claimed in claim 14 wherein the first component is provided with means for adjusting the orientation of the first component and wherein the method further includes the steps of generating reference data relating to the adjustment provided by the adjusting means and processing the reference data and the locations of the plurality of points together to obtain adjustment data for use in the step of adjusting.

16. The method as claimed in claim 15 further including the step of displaying the adjustment data on the display monitor.

17. The method of claim 15 wherein the step of generating the reference data includes the steps of adjusting the orientation of the first component to vary the location of the first beam point to obtain at least one calibration beam point and utilizing the video processor to automatically calibrate the reference data from the location of the at least one calibration beam point.

* * * * *